(12) United States Patent  
Sandoval et al.

(10) Patent No.: US 8,255,396 B2  
(45) Date of Patent: Aug. 28, 2012

(54) ELECTRONIC PROFILE DEVELOPMENT, STORAGE, USE, AND SYSTEMS THEREFOR

(75) Inventors: Michael Sandoval, Kirkland, WA (US); David Bradley Boardman, Redmond, WA (US); Oliver Bruce Downs, Redmond, WA (US)

(73) Assignee: Atigeo LLC, Bellevue, WA (US)

( * ) Notice: Subject to any disclaimer, the term of this patent is extended or adjusted under 35 U.S.C. 154(b) by 342 days.

(21) Appl. No.: 12/334,389

(22) Filed: Dec. 12, 2008

(65) Prior Publication Data

US 2009/0216750 A1 Aug. 27, 2009

Related U.S. Application Data

(60) Provisional application No. 61/067,162, filed on Feb. 25, 2008.

(51) Int. Cl.  
*G06F 7/00* (2006.01)

(52) U.S. Cl. .......................................... 707/732; 707/733

(58) Field of Classification Search .................. 707/722, 707/723, 732, 733, 734, 736, 748, 750, 752  
See application file for complete search history.

(56) References Cited

U.S. PATENT DOCUMENTS

| | | | |
|---|---|---|---|
| 6,385,602 B1 | 5/2002 | Tso et al. ............................. 707/3 |
| 6,408,290 B1 | 6/2002 | Thiesson et al. .................. 706/52 |
| 6,434,556 B1 | 8/2002 | Levin et al. | |
| 6,453,347 B1 | 9/2002 | Revashetti et al. | |
| 6,560,590 B1 | 5/2003 | Shwe et al. ....................... 706/55 |
| 6,581,072 B1 | 6/2003 | Mathur et al. | |
| 6,961,731 B2 | 11/2005 | Holbrook | |
| 7,149,733 B2 | 12/2006 | Lin et al. ............................ 707/4 |
| 7,191,182 B2 | 3/2007 | Anonsen et al. ............... 707/100 |
| 7,237,245 B2 | 6/2007 | Hinson et al. .................. 719/318 |
| 7,257,817 B2 | 8/2007 | Cabrera et al. ................. 719/310 |
| 7,296,022 B2 | 11/2007 | Harjanto ......................... 707/10 |
| 7,627,599 B2 | 12/2009 | Heer et al. | |
| 7,644,098 B2 | 1/2010 | Patel et al. ...................... 707/101 |
| 7,779,004 B1 * | 8/2010 | Walsh et al. ................... 707/734 |
| 7,801,901 B2 | 9/2010 | Surendran | |
| 2002/0129014 A1 | 9/2002 | Kim et al. .......................... 707/5 |
| 2002/0184401 A1 | 12/2002 | Kadel, Jr. et al. ............. 709/315 |
| 2003/0154129 A1 | 8/2003 | Goff | |
| 2003/0204496 A1 | 10/2003 | Ray et al. ........................... 707/3 |
| 2003/0229507 A1 | 12/2003 | Perge | |
| 2004/0158569 A1 * | 8/2004 | Evans et al. .................... 707/100 |

(Continued)

FOREIGN PATENT DOCUMENTS

WO 2004/066163 A1 8/2004

(Continued)

OTHER PUBLICATIONS

Fiaidhi et al. "A Standard Framework for Personalization Via Ontology-Based Query Expansion"; Pakistan Journal of Information and Technology 2(2); 2003; pp. 96-103.

(Continued)

*Primary Examiner* — Angela Lie

(74) *Attorney, Agent, or Firm* — Dorsey & Whitney LLP

(57) ABSTRACT

Examples of the present invention include profiling systems that store, manage, and utilize profile information to take predictive or deterministic action. Embodiments of the invention allow the profiling system to be used as a trusted intermediary where the profile owning entity controls access to their profile information across their network of devices and services.

12 Claims, 9 Drawing Sheets

U.S. PATENT DOCUMENTS

| | | | |
|---|---|---|---|
| 2005/0043989 | A1* | 2/2005 | Shifrin .............................. 705/14 |
| 2005/0076060 | A1 | 4/2005 | Finn et al. |
| 2005/0216434 | A1 | 9/2005 | Haveliwala et al. |
| 2005/0222989 | A1 | 10/2005 | Haveliwala et al. |
| 2005/0257400 | A1 | 11/2005 | Sommerer et al. |
| 2006/0122994 | A1 | 6/2006 | Kapur et al. ....................... 707/4 |
| 2006/0195515 | A1 | 8/2006 | Beaupre et al. ................ 709/203 |
| 2006/0294084 | A1 | 12/2006 | Patel et al. ......................... 707/3 |
| 2007/0038608 | A1 | 2/2007 | Chen |
| 2007/0038765 | A1 | 2/2007 | Dunn |
| 2007/0100898 | A1 | 5/2007 | Petras et al. ................... 707/200 |
| 2007/0106659 | A1 | 5/2007 | Lu et al. ............................ 707/5 |
| 2007/0130109 | A1 | 6/2007 | King et al. ......................... 707/2 |
| 2007/0136371 | A1* | 6/2007 | Golobay et al. ............ 707/104.1 |
| 2007/0162443 | A1 | 7/2007 | Liu et al. |
| 2007/0168546 | A1 | 7/2007 | Greeff ........................... 709/238 |
| 2007/0266019 | A1 | 11/2007 | Lavi ................................... 707/5 |
| 2008/0009268 | A1 | 1/2008 | Ramer et al. ................ 455/412.1 |
| 2008/0040219 | A1 | 2/2008 | Kim et al. |
| 2008/0046313 | A1 | 2/2008 | Chen ................................ 705/14 |
| 2008/0104048 | A1 | 5/2008 | Surendran |
| 2008/0134086 | A1* | 6/2008 | Liao et al. ....................... 715/810 |
| 2008/0140521 | A1 | 6/2008 | Jambunathan et al. .......... 705/14 |
| 2008/0263022 | A1 | 10/2008 | Kostorizos et al. |
| 2008/0300986 | A1 | 12/2008 | Lee ................................. 705/14 |
| 2009/0063473 | A1* | 3/2009 | Van Den Berg et al. ........... 707/5 |
| 2009/0070412 | A1 | 3/2009 | D'angelo et al. |
| 2009/0094093 | A1 | 4/2009 | Phan ................................ 705/10 |
| 2009/0106324 | A1* | 4/2009 | Gutlapalli et al. ............. 707/202 |
| 2009/0171697 | A1 | 7/2009 | Glauser et al. |
| 2009/0216563 | A1 | 8/2009 | Sandoval et al. .................. 705/3 |
| 2009/0216639 | A1 | 8/2009 | Kapczynski et al. ............ 705/14 |
| 2009/0216696 | A1 | 8/2009 | Downs et al. ................... 706/20 |
| 2009/0216750 | A1 | 8/2009 | Sandoval et al. |
| 2009/0287683 | A1 | 11/2009 | Bennett |
| 2009/0327259 | A1 | 12/2009 | Smith |
| 2010/0153324 | A1 | 6/2010 | Downs et al. ................... 706/21 |
| 2010/0228715 | A1* | 9/2010 | Lawrence ...................... 707/706 |
| 2010/0328312 | A1 | 12/2010 | Donaldson |
| 2011/0276563 | A1 | 11/2011 | Sandoval et al. |

FOREIGN PATENT DOCUMENTS

| | | |
|---|---|---|
| WO | 2009/081393 A2 | 7/2009 |
| WO | 2009/108724 A2 | 9/2009 |

OTHER PUBLICATIONS

Riezler et al. "Statistical Machine Translation for Query Expansion in Answer Retrieval"; retrieved on Feb. 24, 2009 from http://www.scialert.net; pp. 1-7.

Amazon.com; "Statistically Improbable Phrases"; retrieved on Feb. 24, 2009, from http://amazon.com/gp/search-inside/sipshelp.html; pp. 1.

Choicestream.com; "About ChoiceStream"; retrieved on Feb. 24, 2009, from http://choicestream.com/company; pp. 1-2.

Matchmine.com; "Frequently Asked Questions"; retrieved on Feb. 24, 2009, from http://web.archive.org/web/20071026055031m__1/www.matchmine.com/help; pp. 1-2.

Peltarion; "Applications of Adaptive Systems"; retrieved on Feb. 24, 2009, from http://peltarion.com/doc/index.php?title=Applications_of_adaptive_systems; pp. 1-7.

Strands; "Company Overview"; retrieved on Feb. 24, 2009, from http://corp.strands.com/; pp. 1

Strands; "History and Name"; retrieved on Feb. 24, 2009, from http://corp.strands.com/history; pp. 1-2.

Wikipedia; "Query Expansion"; retrieved on Feb. 24, 2009 from http://en.wikipedia.org/wiki/Query_expansion; pp. 1-3.

Wikipedia; "Recommender System"; retrieved on Feb. 24, 2009 from http://en.wikipedia.org/wiki/recommendation_engine; pp. 1-4.

Wikipedia; "tf-idf"; retrieved on Feb. 24, 2009 from http://en.wikipedia.org/wiki/Tf-idf; pp. 1-3.

Burke R.; "Hybrid Recommender Systems: Survey and Experiments"; User Modeling and User-Adaptive Interaction; Nov. 2002; pp. 1-29.

Zhang S. et al. "An Online Personalized Recommendation Model Based on Bayesian Networks"; 2007; retrieved on Aug. 21, 2009 from http://springerlink.com/content/r827252065g60728/, pp. 1575-1584.

Sun Microsystems; "Metadata for Object Relational Mapping"; Enterprise JavaBeans 3.0, Final Release; May 2, 2006; pp. 163-208.

Jeffrey M. Barnes; "Object-Relational Mapping as a Persistence Mechanism for Object Oriented Applications"; An honors project presented to the Department of Mathematics and Computer Science; Apr. 28, 2007; pp. 3-113.

Kngine "Web 3.0 Search Engine"; Kngine Overview; pp. 1-4.

Extended European Search Report mailed Jun. 6, 2011 for Application No. 11150913.9.

International Search Report and Written Opinion mailed Nov. 9, 2009 for International Application No. PCT/US2009/035197.

Office Action dated Apr. 28, 2011, for EP Application No. 09714387.9.

Branzan, Claudiu et al., "Relevance Networks for Cold Start Inference of User Preferences", http://snowbirb.djvuzone.org/2010/posters.html, 2010.

* cited by examiner

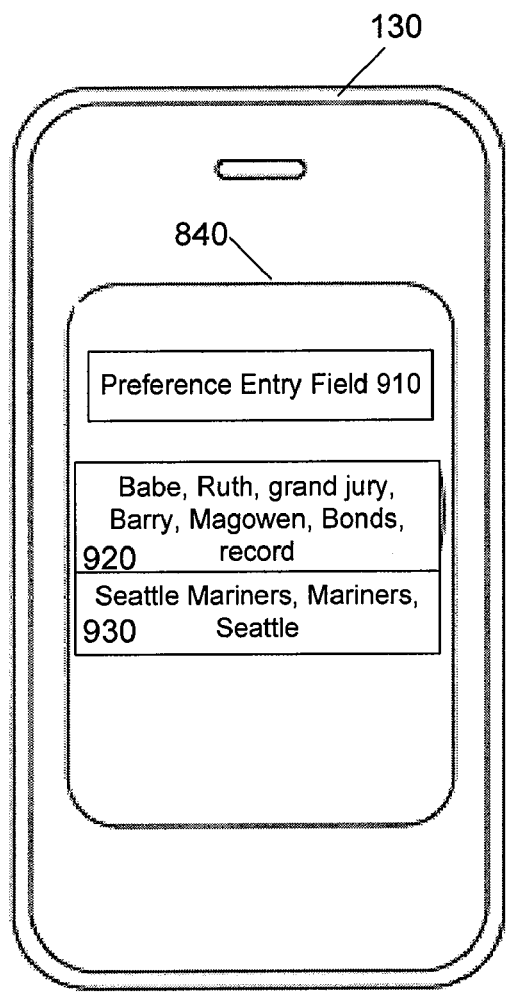
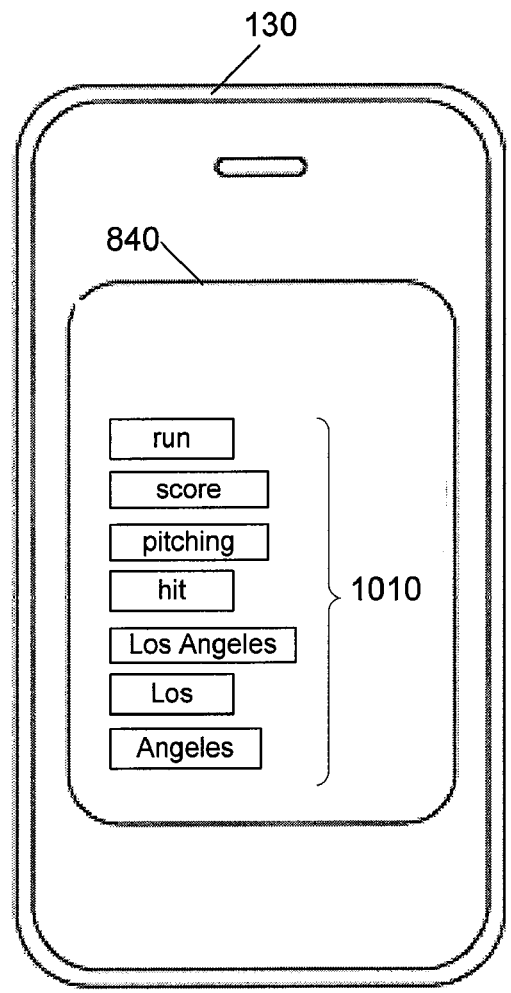
Figure 9                    Figure 10

ELECTRONIC PROFILE DEVELOPMENT, STORAGE, USE, AND SYSTEMS THEREFOR

CROSS-REFERENCE TO RELATED APPLICATION

This application claims the benefit of U.S. Provisional Application 61/067,162, filed Feb. 25, 2008, entitled "Platforms, systems, and methods for data handling," which application is hereby incorporated by reference in its entirety.

TECHNICAL FIELD

Embodiments of this invention relate to computing systems and software for the collection, development, analysis, and use of profile information.

BACKGROUND

Current systems for providing content items to users vary in their approach to user information, for example, in their ability to obtain meaningful information about their users and the extent to which their users control access to and use of their own information.

Some systems simply decide what may be appropriate for or desirable for users based on a single known data point about the user. For example, location based services receive location information from a user's mobile device and identify nearby businesses, gas stations, or ATMs. Other location-relevant information may be provided as well, such as local weather reports. However, the information is selected based only on the user's location. The system has no way of knowing if any of the identified businesses or facts are more relevant for the particular user than any other.

Some systems guess what may be appropriate or desirable for users based on a single action. For example, contextual advertising systems may provide an advertisement for a web page based in part on a target word in the web page. These systems have no way of knowing if the advertisement is actually relevant to the user viewing the web page—the advertisement is chosen simply because it matches a target word on the web page. Some systems decide what products may be desirable for a user based on ratings of other similar products provided by the user. For example, some recommendation services receive limited user ratings, or implicit ratings based on views or purchases, of a certain kind of product—books or movies for example—and recommend other books or movies that the user may like based on similarity to items favorably rated, such as authors, themes, actors, directors, genres, and the like.

Location based systems, contextual advertising, and recommendation systems, are forced to decide what things may be relevant to them on the basis of the limited known information about a user. These systems may not achieve a high success rate of delivering information that is truly relevant to the user because the recommendations are based on limited available information explicitly shared with the system. The system does not know any other information about the user, including information collected by or shared with other systems. These systems, however, may allow the user to have control over their personal information. That is, the user has shared only a limited amount of personal information with the system.

Other systems may make more intelligent recommendations for users based on more detailed information about the user, but these systems may suffer from user privacy problems. For example, deep packet inspection technologies can analyze information sent to and from a user on a broadband network. By inspecting all information sent or received by a user over time, the Internet service provider can develop a clearer picture of the user and what may be relevant to them. However, this approach raises serious privacy concerns because the user may not know that their personal information is being collected, and does not control to whom the information is provided.

These previous systems also suffer from being proprietary to the particular website or electronic service accessed. For example, web sites such as Facebook, Ticketmaster, and ESPN, maintain some profile information associated with their users. However, the profile information stored by the user at one site is generally inaccessible to others, depriving the user of its benefit as they travel to other websites. Allowing one site to share information with others again raises privacy concerns. It often may be prohibitive for one system to obtain the necessary user consent to share profile information with another system.

BRIEF DESCRIPTION OF THE DRAWINGS

FIG. 9 is a schematic illustration of a user interface according to an embodiment of the present invention.

FIG. 10 is a schematic illustration of a user interface according to an embodiment of the present invention.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known computer system components, network architectures, control signals, and software operations have not been shown in detail in order to avoid unnecessarily obscuring the described embodiments of the invention.

Embodiments of the invention provide a profiling system that may obtain, expand, manage, store, and use electronic profiles. Electronic profiles described herein include data structures containing information about an entity, all or a portion of which may be used as input to an analysis engine that may take a predictive or deterministic action based in part on the electronic profile. As will be described below, an entity may control the use of all or portions of their electronic profile, allowing it to be used in part or completely to score and select content responsive to requests from particular entities. The analysis engine uses information from the electronic profile to take a predictive or deterministic action, for example, as will be described further below, suggesting products, services, content, organizations, people, or other items that may be particularly relevant for the profile owning entity. The entity may be a person or a group of people. The entity may also be a segment of people that share a common attribute. The entity may also be a thing such as, but not limited to, a product, place or item of content.

Figure 1:
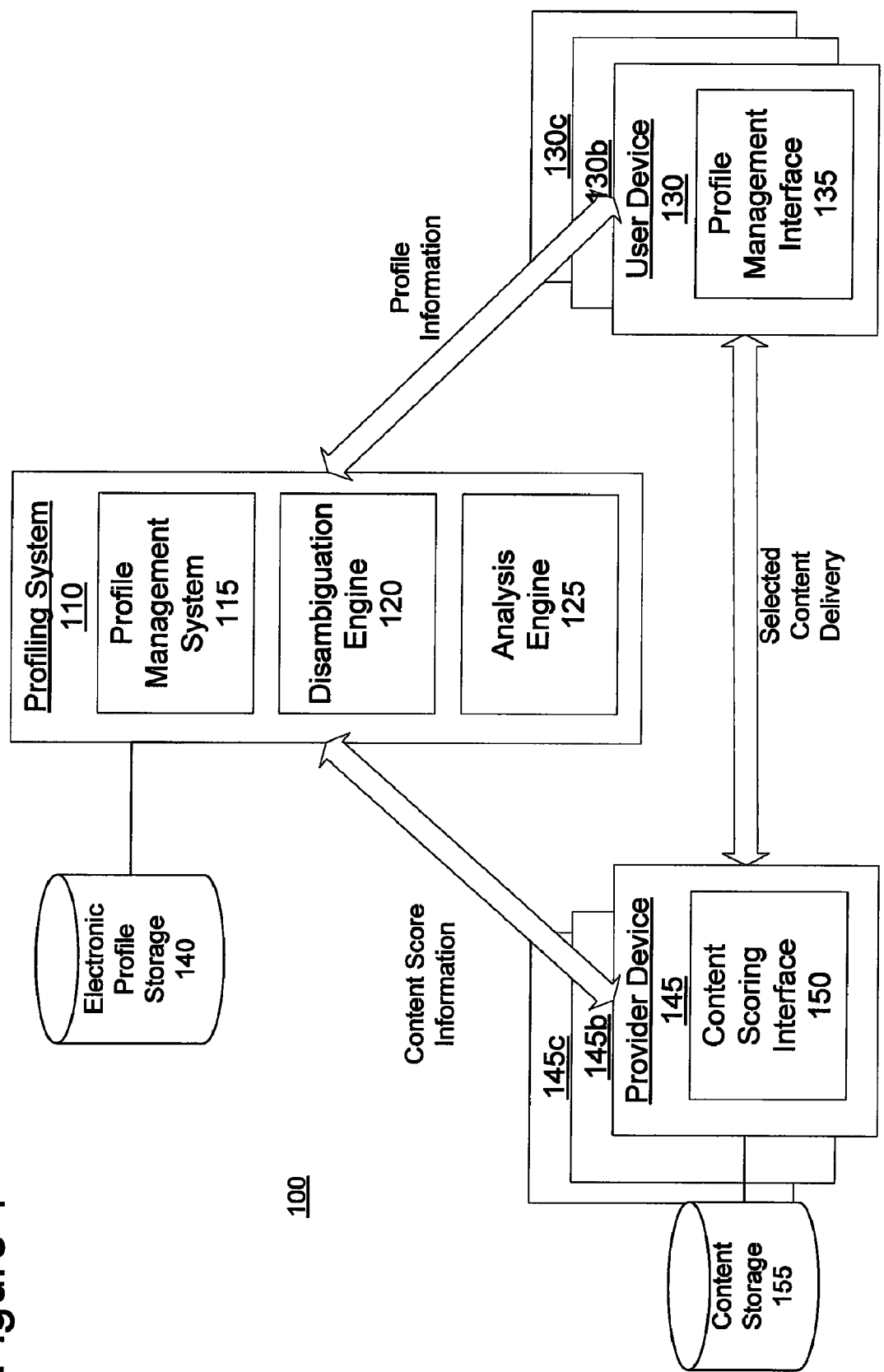
FIG. 1 is a schematic diagram of a system according to an embodiment of the present invention.

An example of a system 100 according to an embodiment of the present invention is shown in FIG. 1. A profiling system 110 includes a profile management system 115, a disambiguation engine 120, and an analysis engine 125. These individual components will be discussed further below. The profiling system 110 generally includes a processor and memory to store computer readable instructions that may cause the processor to implement the functionalities of the profile management system 115, disambiguation engine 120, and analysis engine 125 described below. One or more of these engines may be implemented on a server or other computer or computing device. Although shown as a unitary system, the profiling system 110 may be implemented as distributed across a plurality of computing devices, with portions of the processing performed by each of the devices.

A user device 130, which may be implemented as any device with suitable processing, memory, and communication capabilities to implement a profile management interface 135, is in communication with the profiling system 110. The user device 130 may accordingly be, but is not limited to, a personal computer, kiosk, cell phone, personal digital assistant, television set-top box, or music player. The user device 130 may be specific to a single user, or may be used by multiple users, such as in the case of a publicly accessible workstation or kiosk. In some embodiments, the user need not be a physical person, but may be a representative of a group of people, or may be another automated process or computer program performing a profile entry functionality. Communication between the profiling system 110 and the user device 130 may occur through any mechanism. In some embodiments, the profiling system 110 may be implemented completely or partially as a web service that may communicate with the user device 130 over the Internet using http, in either a secure or unsecured manner, as desired. The profile management interface 135 enables communication with the profile management system 115 to establish, augment, or otherwise manipulate profile information pertaining to an entity represented by a user using the user device 130. The disambiguation engine 120 may receive profile information supplied from the user device 130 and further process the information to reduce ambiguity in the information provided, as will be described further below. The processing to reduce ambiguity may occur dynamically through interaction with the user device. Any number of user devices may be in communication with the profiling system 110, including the user devices 130b and 130c shown in FIG. 1.

Profile information received from the user device 130 and other sources is processed by the profile management system 115 and disambiguation engine 120 to generate electronic profiles that are stored in the electronic profile storage 140. As will be described further below, the electronic profiles may be database structures and accordingly may be stored in a database as shown in FIG. 1. However, any type of electronic storage may be used to store electronic profiles and the profiles may be stored in any number of distinct storage locations, and individual profiles may be distributed across a plurality of storage locations. Electronic profiles will be discussed in greater detail below.

A content provider, or other entity seeking to interact with profile owning entities, may communicate with the profiling system 110 using a provider device 145. As with the user device 130, any device with suitable processing, memory, and communication capabilities to implement a content storing interface 150, may be used. Accordingly, the provider device 145 may be implemented as, but is not limited to, a server computer, personal computer, cell phone, personal digital assistant, or kiosk. The provider device 145 may communicate with the profiling system 110 in any manner, wired or wireless.

The provider device 145 is in communication with content storage 155. The content storage 155 is any suitable electronic memory storage that contains information the provider may want to share with one or more profile owning entities. The content storage 155 may be, but is not limited to, news or entertainment content, such as text files or media files, databases, advertisements, social contacts, customer relationship management information, enterprise resource management information, catalog data, inventory, images, movies, charity information, sports information, or combinations of these types of information. Any number of provider devices may be in communication with the profiling system 110 including the provider devices 145b and 145c. The additional provider devices may have their own associated content storage, or may be in communication with the content storage 155.

The provider device 145 implements a content scoring interface 150 that may be implemented as a processor and a memory storing computer readable instructions causing the processor to implement the content scoring interface functionality described. Content scoring will be described further below, but as a general overview, the content scoring interface 150 makes some or all of the content in content storage 155 accessible to the analysis engine 125. The analysis engine 125 may then score content items based on one or more of the electronic profiles stored in electronic profile storage 140. The output of this process may be provided to the content scoring interface 150 in a variety of ways, including numerical scores assigned to content in the content storage 155 based on its relevance to the electronic profile or profiles consulted, or a ranked list of content in the content storage 155 listed in ascending or descending relevance order, or an indication of content items having a relevance score above or below a threshold relevance score.

An overview of the use of the system 100 according to an embodiment of the invention is now described, although further details are provided below. An entity may communicate profile information to the profiling system 110 through the profile management interface 135 in communication with the profile management system 115. The profile management system 115 and the disambiguation engine 120 may refine and expand the profile information provided. An electronic profile of the entity is stored in electronic profile storage 140. While a single electronic profile storage 140 location is shown in FIG. 1, the electronic profile may in some embodiments be distributed across a plurality of storage locations, including across a plurality of storage locations associated with different physical electronic devices that may be used by an entity. Accordingly, in some embodiments, only a portion of the entity's profile may be located on the electronic profile storage 140. The entity may then request information from a provider. In FIG. 1, the user device 130 is shown as communicating with the provider device 145. While the entity and the provider may communicate in some embodiments, as shown in FIG. 1, using the same devices containing the profile management interface 135 and the content scoring interface 150, in other embodiments, the entity and the provider may communicate using different devices. On receiving a request for information from an entity, the provider device 145 through the content scoring interface 150 requests an analysis from the analysis engine 125. The analysis engine 125 accesses the entity's electronic profile stored in electronic profile storage 140 and, provided the entity has chosen to allow all or a portion of its profile information to be used responsive to a request from the provider, scores the content in the content storage 155 in accordance with the accessed electronic profile. The resultant scores are provided to the provider device 145 through the content scoring interface 150. Having received the scores, the provider may then communicate content to the entity based on the scores.

In this manner, the profiling system 110 may serve as a trusted intermediary between an entity and a content provider. The content provider receives an analysis of its content based on an entity's profile information without actually receiving the profile information itself. Being able to control the accessibility of the profile information, and knowing content providers may not obtain the information directly, entities may share a greater amount of information with the profiling system 110. Further, through the profile management system 115 and disambiguation engine 120, the electronic profiles may be more structured while being easily created than those created purely through freeform user input. The disambiguation engine 120 may suggest related terms for addition to an entity's profile, that the entity may confirm or deny.

Having described an overview of an example of a system 100 according to the present invention, examples of electronic profiles will now be discussed. Electronic profiles described herein include data structures containing information about an entity, all or a portion of which may be used as input to an analysis engine that may take a predictive or deterministic action based in part on the electronic profile. For example, recall electronic profiles may be stored in the electronic profile storage 140 and used by the analysis engine 125 to identify content that may be relevant to the entity associated with the electronic profile.

Figure 2:
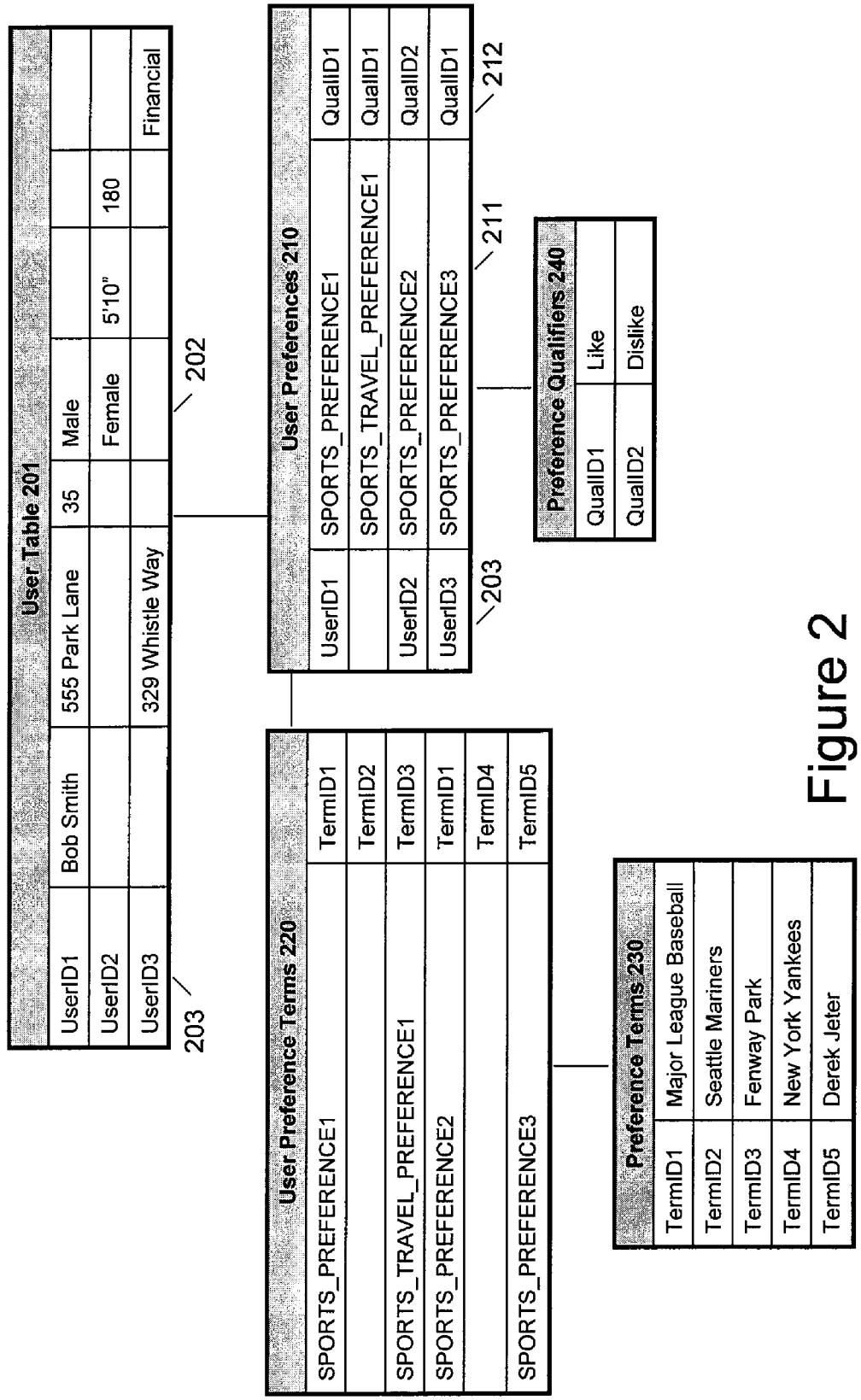
FIG. 2 is a schematic illustration of a conceptual database schema for an electronic profile according to an embodiment of the present invention.

Examples of electronic profiles accordingly include data structures. Any type of data structure may be used that may store the electronic profile information described below. In one embodiment, the electronic profile is stored in a relational database. FIG. 2 illustrates a portion of a conceptual database schema 200 for an electronic profile according to an embodiment of the present invention. The database schema 200 is organized as a star schema, but other organizations may be employed in other embodiments. The schema 200 includes several tables relating aspects of the electronic profile to one another that provide information about the entity owning the electronic profile. The database constructed according to the schema 200 may be stored on generally any suitable electronic storage medium. In some embodiments, portions of an electronic profile may be distributed amongst several electronic storage media, including among storage media associated with different electronic devices used by an entity.

Information stored in an electronic profile about an entity may include, but is not limited to any combination of the following: data, preferences, possessions, social connections, images, permissions, recommendation preferences, location, role and context. These aspects of an entity may be used in any combination by an analysis engine to take predictive or deterministic action as generally described above. Examples of aspects of profile information included in the electronic profile 200 will now be described further.

The electronic profile represented by the schema 200 includes data about an entity in a user table 201. While the term 'user' is used in FIG. 2 to describe tables and other aspects of the profile, the term is not meant to restrict profiles to individuals or human representatives. The information contained in an electronic profile is generally information about an entity associated with the electronic profile, which may also be referred to as the entity owning the electronic profile. The entity may be a person or a group of people. The entity may also be a segment of people that share a common attribute. The entity may also be a thing such as, but not limited to, a product, place, business, or item of content. The entity may be a segment of things that share a common attribute. The term 'user' in FIG. 2 simply refers to the entity associated with the profile.

Data 202 about the entity stored in the user table 201. The table 201 may include a column for each type of data. For example, data associated with UserID1 includes name ('Bob Smith'), address (555 Park Lane), age (35), and gender (Male) of the entity. Data associated with UserID2 includes height (5'10"), weight (180), and gender (Female). Data associated with UserID2 includes financial information and an address (329 Whistle Way). Data about an entity stored in the user table 201 may generally include factual or demographic information such as, but not limited to, height, address, clothing sizes, contact information, financial information, credit card number, ethnicity, weight, and gender. Any combination of data types may be stored. The user table 201 also includes a user ID 203. The user ID may be generated by a system generating or using the electronic profile, or may be associated with or identical to a user ID already owned by the profile owning entity, such as an email account or other existing account of the entity. Each entity having an electronic profile may have a corresponding user table, such as the user table 201, stored in the electronic profile storage 140 of FIG. 1.

Preferences of an entity may also be stored in the entity's electronic profile. Preferences generally refer to subjective associations between the entity and various words that may represent things, people, or groups. Each preference of an individual represents that association—"I like cats," for example, may be one preference. Preferences may be stored in any suitable manner. In the schema of FIG. 2, preferences are stored by use of the user preferences table 210, the user preference terms table 220, the preference terms table 230, and the preference qualifiers table 240, which will be described further below. The four tables used to represent preference in FIG. 2 is exemplary only, and preferences may be stored in other ways in other embodiments such that a profile owning entity is associated with their preferences.

Referring again to FIG. 2, the user table 201 of an entity is associated with a user preferences table 210. The user preferences table 210 includes userIDs 203 of entities having profiles in the electronic profile storage 140 and lists individual preference IDs 211 associated with each userID. For example, the UserID1 is associated with SPORTS-PREFERENCE1 and SPORTS_TRAVEL_PREFERENCE1 in the example shown in FIG. 2. Although shown as including only a few user IDs 203, the user preferences table 210 may generally include a list of multiple user IDs known to the profiling system and a list of individual preference IDs associated with the userIDs. In this manner, an entity's preferences may be associated with the data related to the entity. Generally, any string may be used to represent a preference ID. Also included in the user preference table 210 are qualifier IDs 212 that are used to record an association with terms contained in the preference. The qualifiers will be discussed further below.

Each preference ID has an associated entry in a user preference terms table 220. The user preference terms table 220 contains a list of term IDs associated with each user preference ID. In FIG. 2, for example, the preference ID SPORTS_PREFERENCE1 is shown associated with TermID1 and TermID2. Any string may generally be used to represent the term IDs. Each TermID in turn is associated with an entry in a preference term table 230. The preference term table 230 lists the actual terms represented by the TermID. A term may generally be any string and is generally a unit of meaning, which may be one or more words, or other representation. As shown in FIG. 2, the preference terms table 230 indicates the TermID1 is associated with the term Major League Baseball. Although only one term is shown associated with the TermID1, any number of terms may be so associated.

Accordingly, as described above, an entity may be associated with preferences that ultimately contain one or more terms. However, the relationship between the entity and the terms has not yet been described. An entity's preferences may include a scale of likes, dislikes, or both of the entity. Further an entity's preferences may include information about what the entity is or is not, does or does not do in certain circumstances. In the schema 200 of FIG. 2, each preference may be associated with one or more qualifiers, as indicated by an association between the preference ID and a qualifier ID in the user preferences table 210. A term associated with each qualifier ID is then stored in a preference qualifiers table 240. Qualifiers describe the relationship of the preference terms to the profile owning entity. Examples of qualifiers include 'like' and 'dislike' to describe a positive or negative association with a preference, respectively. Other qualifiers may be used including 'when', 'when not', 'never', 'always', 'does', 'does not', 'is', and 'is not' to make more complex associations between preference words and the profile owning entity. As shown in FIG. 2, the qualifier QualID1 represents the association 'like' and, QualID2 represents the association 'dislike'.

Accordingly, the structure shown in FIG. 2 encodes two preferences for an entity represented by UserID1. SPORTS_PREFERENCE1 indicates UserID1 likes Major League Baseball and the Seattle Mariners. SPORTS_PREFERENCE2 indicates UserID1 likes Fenway Park. Similarly, UserID2 has SPORTS_PREFERENCE2, which indicates UserID2 dislikes Major League Baseball and the New York Yankees. UserID3 has SPORTS_PREFERENCE3, which indicates UserID3 likes Derek Jeter.

The manner of storing preferences using the tables described in FIG. 2 may aid in efficient storage and analysis by allowing, for example, multiple termIDs to be associated with multiple user preference IDs without requiring storing the individual terms multiple times in the profile storage 140 of FIG. 1. Instead, multiple associations may be made between the termID and multiple user preferences. However, as discussed, generally, any data structure may be used to encode an electronic profile of an entity. In some embodiments, a profile may be represented and optionally stored as a vector or index. The vector may uniquely identify an entity associated with the profile. For example, the profile vector may represent a plurality of axes, each axis representing a term, word, or user device, and the vector include bits associated with each term, word, and user device to be included in the profile.

Further information regarding an entity may be stored in an entity's electronic profile including possessions, images, social connections, permissions, recommendation preferences, location, roles, and context. Although not shown in FIG. 2, these further aspects may be stored as additional star tables associated with the central user table 201. Possessions of the entity may include things the entity owns or has access to including, but not limited to, gaming systems, cell phones, computers, cars, clothes, bank or other accounts, subscriptions, and cable or other service providers.

Social connections of the entity may include, but are not limited to, connections to friends, family, neighbors, co-workers, organizations, membership programs, information about the entity's participation in social networks such as Facebook, Myspace, or LinkedIn, or businesses an entity is affiliated with.

Permissions for accessing all or a portion of the electronic profile are described further below but may include an indication of when an entity's profile information may be used. For example, an entity may authorize their profile information to be used by the profiling system responsive only to requests from certain entities, and not responsive to requests from other entities. The permissions may specify when, how, how often, or where the profiling system may access the entity's profile responsive to a request from a specific entity, or type of entity. For example, an entity may specify that sports websites may obtain information about content relevant to the entity's profile, but that banks may not. As generally described above, only the profiling system has direct access to the stored profile information, and the profile information is not generally shared with content providers that may request scoring of their content based on the entity's profile. However, the scoring may only be undertaken in some embodiments when the entity has granted permission for their profile to be used to provide information to the particular content provider.

Recommendation preferences may include whether the entity would like or accept recommendations for additional information to be added to their electronic profile, or for data or possessions. The recommendation preferences may specify which entities may make recommendations for the electronic profile owning entity and under what conditions.

Location information of the entity may include a current location determined in a variety of levels of granularity such as, but not limited to, GPS coordinate, country, state, city, region, store name, church, hotel, restaurant, airport, other venue, street address, or virtual location. In some embodiments location information may be obtained by analyzing an IP address associated with an entity.

Roles of the entity may include categorizations of the entity's relationships to others or things including, but not limited to, father, mother, daughter, son, friend, worker, brother, sister, sports fan, movie fan, wholesaler, distributor, retailer, and virtual persona (such as in a gaming environment or other site).

Context of the entity may include an indication of activities or modes of operation of the entity, including what the entity is doing in the past, present, or future, such as shopping, searching, working, driving, or processes the entity is engaged in such as purchasing a vacation.

As will be described further below, all or a portion of the electronic profile may be used as an input to an analysis engine. In some embodiments, there may be insufficient data about an individual to have a meaningful output of the analysis engine based on their electronic profile. Accordingly, in some embodiments the profile of a segment sharing one or more common attributes with the individual may be used as input to the analysis engine instead of or in addition to the individual's profile. The profile of a segment may also be used to select content that may be relevant for that segment of entities, and pass content to entities that share one or more attributes with the segment.

Having described exemplary mechanisms for storing profile information and the content of electronic profiles, exemplary methods and systems for obtaining profile information will now be discussed. Profile information may generally be obtained from any source, including from a representative of the profile owning entity, other individuals, or from collecting data about the profile owning entity as they interact with other electronic systems. In some embodiments, referring back to FIG. 1, profile information may be directly entered by a profile owning entity or their representative from the user device 130 using the profile management interface 135.

Figure 3:
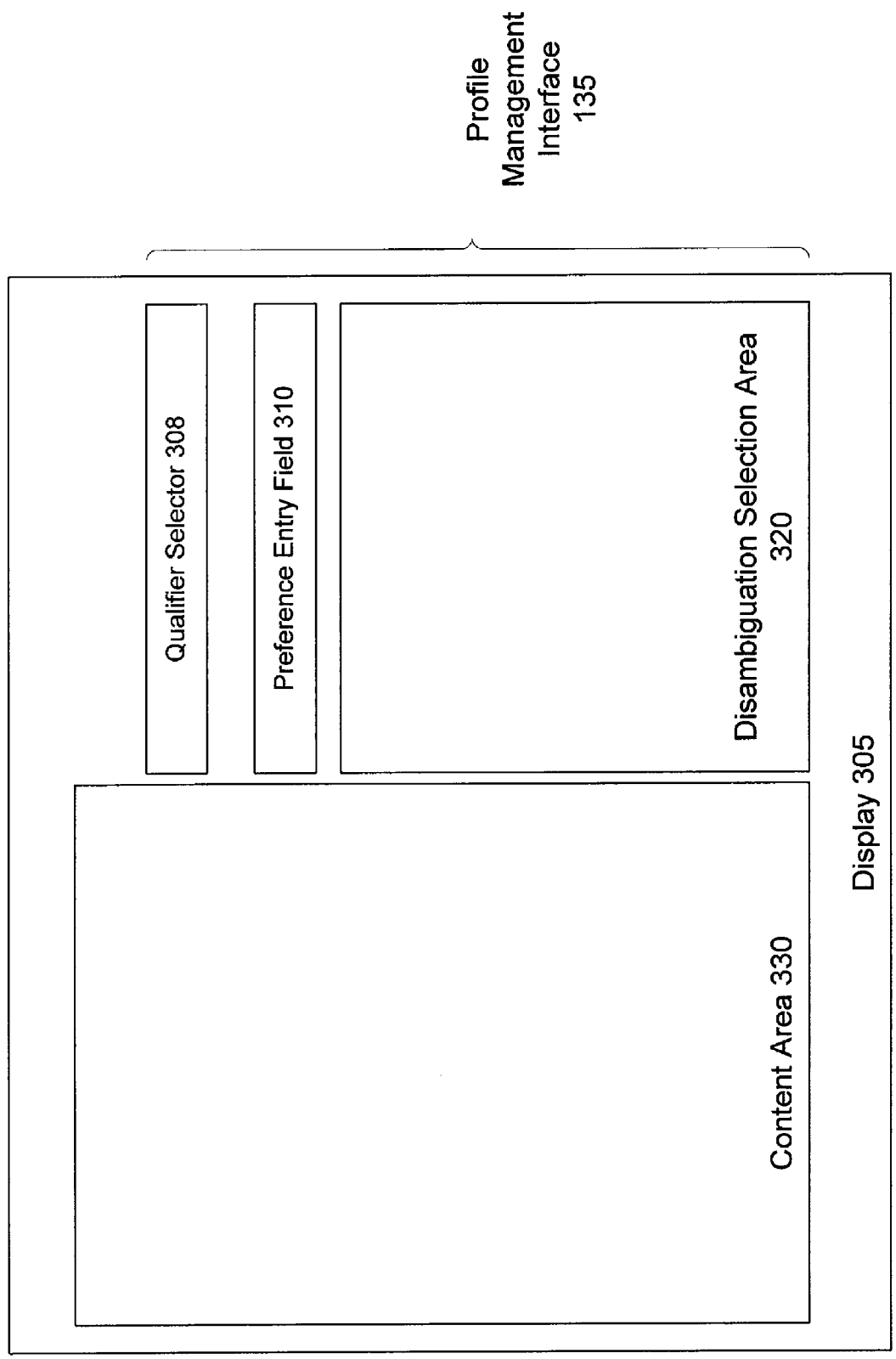
FIG. 3 is a schematic illustration of a profile management interface operating in a browser window of a display according to an embodiment of the present invention.

The profile management interface 135 may take any form suitable for receiving profile information from a profile owning entity or their representative. In one embodiment, the profile management interface 135 includes an application operating on the user device 130. The application on the user device 130 may communicate with the profiling system 110. In one embodiment, the disambiguation engine, analysis engine, or both may be implemented as an application programming interface (API), and the application operating on the user device 130 may call one or more APIs operated by the profiling system 110. In some embodiments, the application on the user device 130 that is in communication with the profiling system 110 operates in an Internet browser window, and one embodiment of the profile management interface 135 is shown in FIG. 3 operating in a browser window of a display 305 of the user device. A profile owning entity, or a representative of that entity, may enter profile information into the preference entry field 310. Prior to entering information, the entity may have identified themselves to the profiling system by, for example, entering a username, password, or both, or other methods of authentication may be used including identification of one or more user devices and their context associated with the entity. When entering profile information into the preference entry field 310, the entity may also select a qualifier associated with the profile information using a qualifier selector 308. The qualifier selector 308, which may be unique for the entity in some embodiments, may include a drop-down menu, buttons depicting different qualifiers, or other mechanisms. For example, the qualifier selector 308 may include a button for 'Like' and one for 'Dislike' so an entity could specify that they like or dislike the terms they provide in the preference entry field 310. The entity may submit the entered profile information to the profile management system 115 of the profiling system 110 in FIG. 1. Information may be submitted, for example, by pressing an enter key, or clicking on an enter button displayed in the browser window 302. The information may be communicated to the profile management system 115 using any suitable communication protocol, including http.

Accordingly, profile owning entities may provide profile information to the profile management system 115. The profile information may be directly captured—"I like cats" in the case of a preference, or "I am a father" in the case of a role. However, in some instances, the provided profile information may be ambiguous, such as "I like the giants." It may be unclear whether the profile owning entity intends to indicate a preference for the New York Giants, the San Francisco Giants, or large people.

The profile information submitted by an entity may accordingly be submitted to the disambiguation engine 120 of FIG. 1. As will be described further below, the disambiguation engine 120 may provide a list of relevant terms that may be displayed in the disambiguation selection area 320 of FIG. 3. An entity may then select the relevant terms from the disambiguation list for addition to the profile being managed. Alternatively or in addition, an entity may select or otherwise indicate, such as by right-clicking, one or more terms displayed anywhere in the browser window, or more generally displayed by the user device, that a term should be added to the entity's profile. Alternatively or in addition, embodiments of a profiling system may identify an action of the entity and automatically add a related term to the electronic profile of the entity. After processing by the analysis engine 125, which will be described further below, relevant content may be displayed in the content area 330. In some embodiments, the content area 330 may not be provided on a same screen with the profile management interface 135, and in some embodiments the content area 330 need not be on the same user device. That is, while profile information may be entered or revised on one device, content displayed or provided based on that profile information may be provided on a different device in some embodiments.

Accordingly, the disambiguation engine 120 functions to select terms, based on preference information input by an entity, that may also be relevant to the entity and may be considered for addition to the entity's electronic profile. In one embodiment, the disambiguation engine 120 may simply provide a list of all known terms containing the entity's input. For example, if the entity entered "giants," a dictionary or sports listing of all phrases or teams containing the word "giants" may be provided. While this methodology may accurately capture additional profile information, it may be cumbersome to implement on a larger scale.

Figure 4:
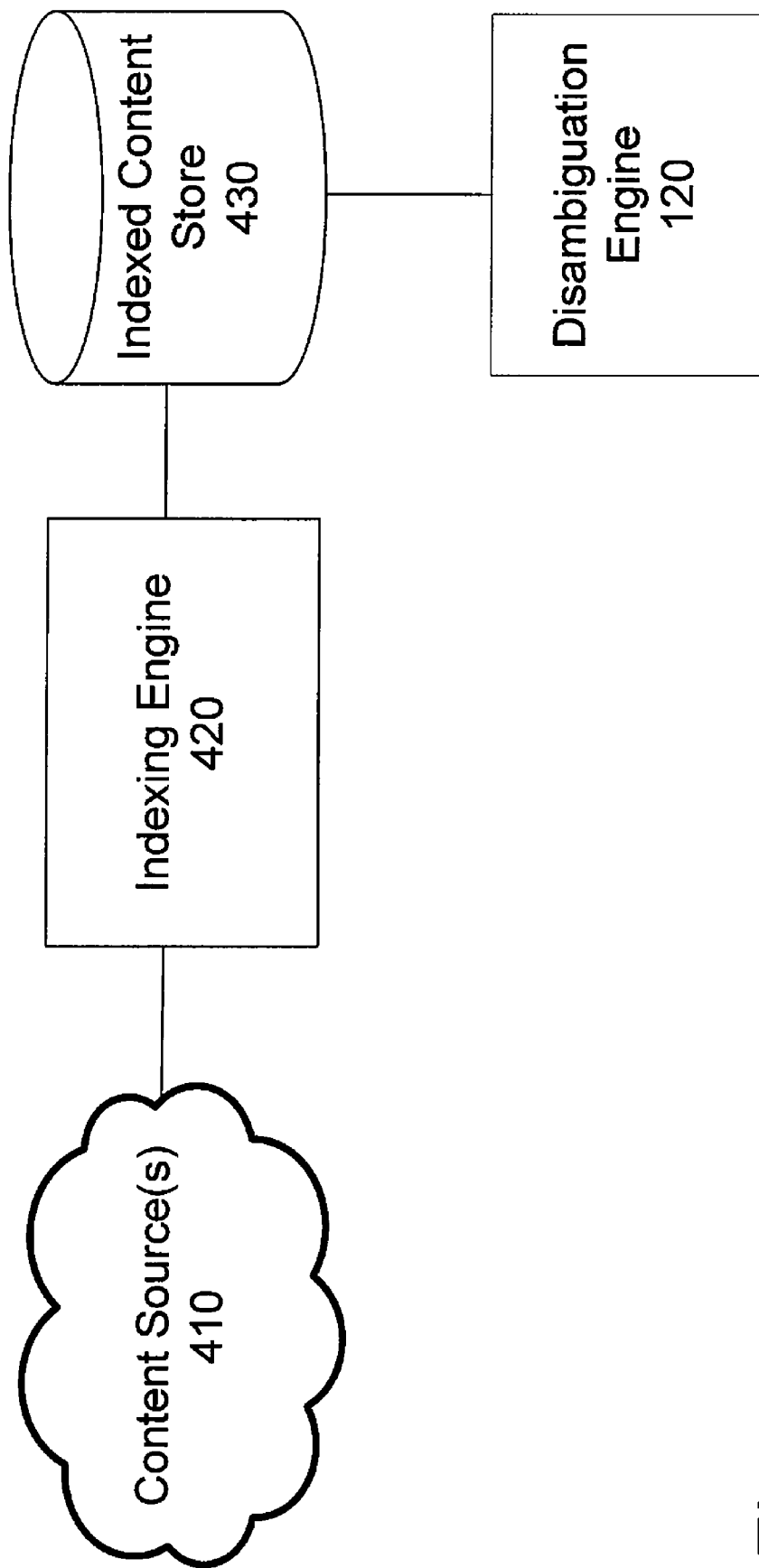
FIG. 4 is a flowchart illustrating operation of a disambiguation engine according to an embodiment of the present invention.

Accordingly, the disambiguation engine 120 may function along with an indexing engine 420 as shown in FIG. 4. Generally, the indexing engine 420 accesses one or more content sources 410 to analyze the content stored in the accessed content sources 410 and generate an indexed content store 430. Although shown as separate storage, the indexed content store 430 may include indexing information stored along with the content from the content sources 410, or may include only index records related to the content in the content sources 410. The index information generally includes information about the relative frequency of terms in the content from the content sources 410. In this manner, as will be described further below, terms may be identified that frequently appear along with a query term, or in a same pattern as a query table. The disambiguation engine 120 may then access the indexed content store 430 to more efficiently identify terms related to preferences expressed by an entity. The expressed preference may be stored in one storage location, or distributed across multiple storage locations.

Figure 5:
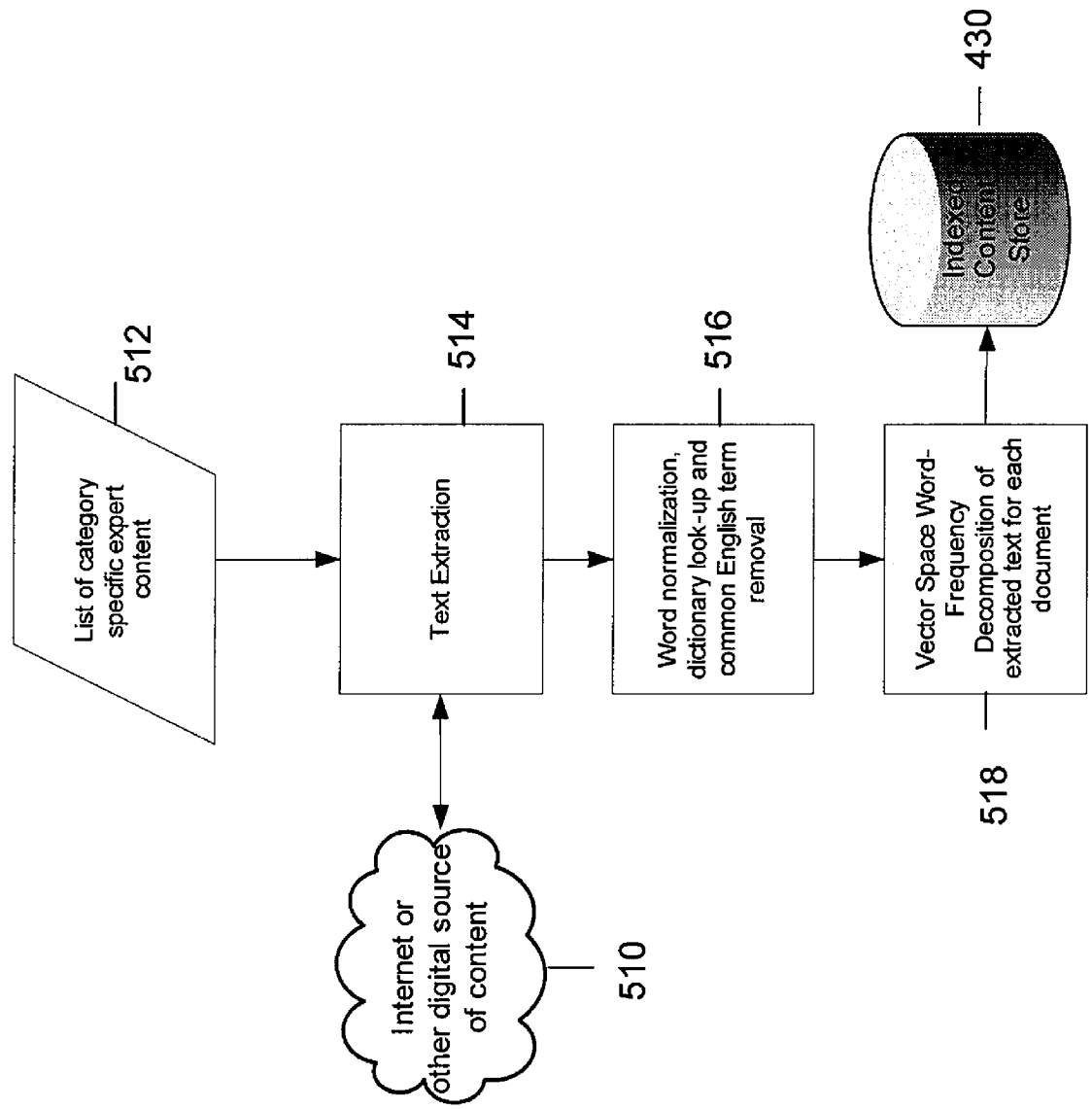
FIG. 5 is a flowchart illustrating operation of an indexing engine according to an embodiment of the present invention.

The indexing engine 420 may generally use any methodology to index documents from the content sources 410. The indexing engine 420 generally includes a processor and memory encoded with computer readable instructions causing the processor to implement one or more of the functionalities described. The processor and memory may in some embodiments be shared with those used to implement the disambiguation engine, analysis engine, or combinations thereof. In one embodiment, a vector space representation of documents from the content sources 410 may be generated by the indexing engine 420. A vector representation of each document may be generated containing elements representing each term in the group of terms represented by all documents in the content sources 410 used. The vector may include a term frequency—inverse document frequency measurement for the term. An example of a method that may be executed by the indexing engine 420 is shown in FIG. 5. FIG. 5 further demonstrates an example in which an indexed content store 430 may be created specific to a particular category. In some embodiments, however, the indexed content store may be generalized to one or more categories. However, in embodiments where the indexed content store 430 is specific to a single category of information, it may be advantageous to provide several content stores (which may be physically stored in the same or different media), each containing indexed content for a specific category. In this manner, the indexing performed by the indexing engine 420 will be specific to the category of information, and may in some cases enable greater relevance matching than querying a general content store.

Proceeding with reference to FIG. 5, the indexing engine may receive a list of category specific expert content 512. The expert content may, for example, include a group of content in a particular category that may be considered representative of content in the category (using, for example, the Wikipedia Commons data set, or any other collection of information regarding a particular category). The indexing engine locates the category specific content in the list over the Internet or other digital source of category-specific content 510. The source of category specific content 510 may be located in a single storage medium, or distributed among several storage mediums accessible to the indexing engine over the Internet or other communication mechanisms.

The indexing engine extracts the text 514 from the expert content and may perform a variety of filtering procedures such as word normalization, dictionary look-up and common English term removal 516. During word normalization, tenses or variations of the same word are grouped together. During dictionary look-up, meanings of words can be extracted. During common English term removal, common words such as 'and' or 'the' may be removed and not further processed. Grammar, sentence structure, paragraph structure, and punctuation may also be discarded. The indexing engine may then perform vector space word-frequency decomposition 518 of the extracted text from each document. The use of the term document herein is not meant to limit the processing of actual text documents. Rather, the term document refers to each content unit accessed by the indexing engine, such as a computer file, and may have generally any length.

During the decomposition, each document may be rated based on the term frequency (TF) of the document. The term frequency describes the proportion of terms in the document that are unique. The term frequency may be calculated by the number of times the term appears in the document divided by the number of unique terms in the document. A vector of term frequencies may be generated by the indexing engine to describe each document, the vector having elements representing a term frequency for each term contained in the entire content store analyzed.

The vector representing each document may also contain an inverse document frequency (IDF) measure, that reflects how often the term is used across all documents in the content store, and therefore a measure of how distinctive the term may be to specific documents. The IDF may be calculated as the log of the number of documents containing the term divided by the number of documents in the content store.

Accordingly, a term frequency-inverse document frequency ("TF-IDF") score for a term and a document within may be determined by multiplying the term frequency value for the term in the document and the inverse document frequency score for the term in the content store. In this manner, terms having a high TF-IDF score may be more representative of the document, content store, or both, than those having a low TF-IDF score (which may be ubiquitous terms throughout the content store such as the term 'the' or 'and').

In some embodiments, a Kullback-Leibler Divergence, $D_{KL}$ may also be included in a vector representation of a document. $D_{KL}$ may provide a measure of how close a document is to a query—generally, how much common information there is between the query and the document. $D_{KL}$ is a measure of a distance between two different probability distributions—one representing the distribution of query terms, and the other representing the distribution of terms in the document. $D_{KL}$ may be calculated as:

$$D_{KL}(p\|q) = \sum_i p_i \log\left(\frac{p_i}{q_i}\right)$$

where p is the distribution of terms in the document, q is the distribution of query terms, and i represents each term. The distribution of terms in the document may be a vector with entries for each term in a content store, where the entries are weighted according to the frequency of each term in the document. The distribution of query terms may be a vector with entries for each term in a content store, where the entries are weighted according to the frequency of each term in the query.

Accordingly, using TF-IDF, Kullback-Leibler Divergence, other methods of document relevance measurements, or combinations thereof, the indexed content store 430 of FIG. 5 contains one or more content indexes representing a measure of the importance of various terms to each analyzed document.

Figure 6:
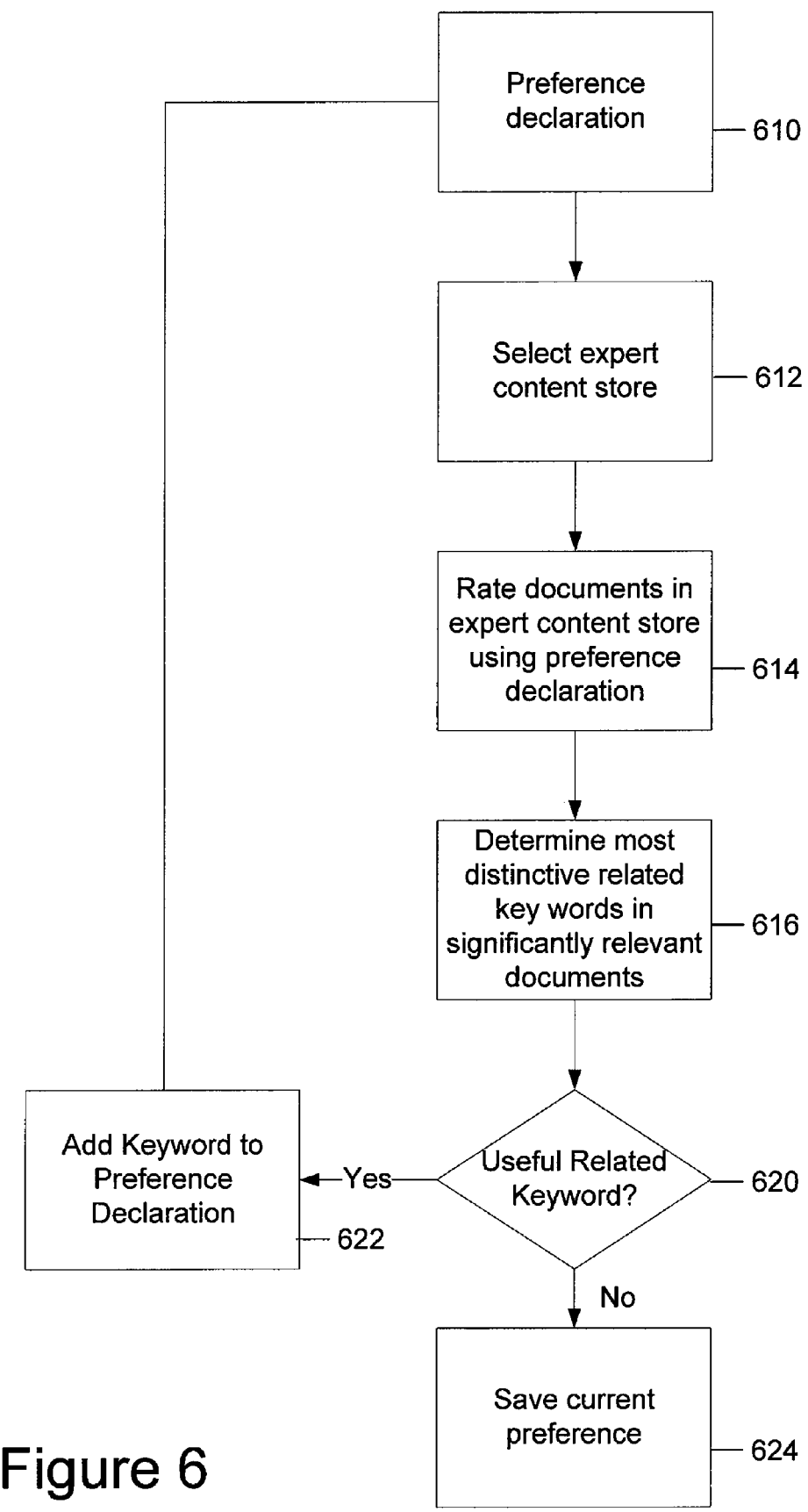
FIG. 6 is a flowchart illustrating operation of a disambiguation engine according to an embodiment of the present invention.

Having described the indexing of documents, a process for disambiguating a preference by the disambiguation engine 120 using the indexed content store 430 is illustrated in FIG. 6. An entity declares 610 a preference, for example by entry into the preference entry field 310 of FIG. 3. The disambiguation engine 120 then selects an expert content store 612 to query using the declared preference. The selection may be made in a variety of ways. In some embodiments, a single content store is used and no selection need be made. In other embodiments, the disambiguation engine 120 receives contextual information about the entity entering preference information, and the contextual information is used to select the expert content store. For example, in one embodiment, the disambiguation engine receives information that the entity entering profile information is doing so from a sports-related website, and accordingly, an expert sports content store may be selected.

Documents in the expert content store are rated 614, as described above, based on their relevance to individual terms. In some embodiments, the rating is conducted once the preference is entered, while in others, the already stored vectors containing the measurements are accessed. A set of most relevant documents to the expressed preference may be identified. The most relevant documents may be identified by calculating a relevance number for each document based on the preference terms. A relevance number represents the relevancy of each document to the preference, using the entered preference terms. Embodiments of the relevance number use a 0-100 scale, and may accommodate a multi-term preference. In other embodiments, other scales or ranges may be used for the relevance number including 0-10, or negative numbers may be used. Negative relative numbers may be used in some embodiments to express scores relative to profile aspects an entity has provided a negative grammar for, such as 'dislike' or 'not'. The relevance number for a single term may generally be calculated as a normalized TF.IDF value. In one embodiment, the calculation may be made by subtracting a minimum TF.IDF value for all terms in the indexed content store from the TF.IDF value of the term and dividing the result by the difference between the maximum TF.IDF value for all terms in the indexed content store in the minimum TF.IDF value for all terms in the indexed content store. For multiple terms in a preference, the relevance number of each document may be given as:

$$RelevanceNumber = \frac{1}{NTerms} \sum_{i=1}^{NTerms} \frac{TF.IDF_i - \min(TF.IDF)}{(\max(TF.IDF) - \min(TF.IDF))}$$

NTerms is the number of terms in the query. The relevance number accordingly is a sum of the relevance numbers for each term in the query, divided by the number of terms. In this manner, the relevance number represents a normalization of term-by-term relevance scores for individual terms. In this manner, the relevance number is based in part on the TF-IDF value for that term, but may be normalized with the maximum and minimum TF-IDF values for that term across all documents in a content store or other set. The relevance number calculated as above is accordingly a number between 0 and 100. The Kullback-Leibler Divergence, $D_{KL}$, may also be used as a relevance number to score content items from a content store, or across multiple content stores. In the case of $D_{KL}$, a lower $D_{KL}$ number indicates a more relevant content item (as it may indicate the information space between the item and the preference is small).

While in some embodiments, the calculation of relevance numbers may not change over time as the profiling system operates, in some embodiments relevance numbers or the method for calculating relevance numbers, may be modified in a variety of ways as the profiling system operates. The relevance numbers may be modified through entity feedback or other learning methodologies including neural networks. For example, relevance numbers as calculated above may be used to develop a set of neural network weights that may be used to initialize a neural network that may refine and learn techniques for generating or modifying relevance values. The neural network may be trained on a set of training cases, that may be developed in any of a variety of ways, including by using entity selection of a document to set a target value of a resultant relevance number. During training, or during operation of the profiling system, error functions may be generated between a desired outcome (such as a training case where an entity or administrator specifies the relevance score, or a situation in operation where entity feedback indicates a particular relevance score) and a calculated relevance number. The error function may be used to modify the neural network or other system or method used to calculate the relevance number. In this manner, the computation of relevance numbers, and in some embodiments, the relevance numbers themselves, may change as the profiling system interacts with content items and entities. For example, a relevance value for a content item may be increased if entity feedback indicates the content item is of greater or lesser relevance. The entity feedback may be explicit, such as indicating a degree of relevance the entity would assign to the content item, or implicit, such as by identifying multiple entities have selected the content item or responded to the content item to a degree that indicates the relevance number should be higher, or lower, than that assigned by the profiling system. Entity feedback may also include feedback obtained by monitoring the activity, selections, or both of one or more entities without necessarily receiving intentional feedback from the entity. Examples of neural networks, entity feedback modification, and other computer learning techniques usable with embodiments of the present invention are described in co-pending U.S. Provisional Application 61/122,282, entitled "Determining relevant information for domains of interest," filed Dec. 12, 2008, which application is hereby incorporated by reference in its entirety for any purpose.

Referring back to FIG. 6, the set of significantly relevant documents may be identified by setting a threshold relevance number, or by setting a fixed number of results, and selecting that number of results in relevance number order, regardless of the absolute value of the relevance number. In some embodiments, the most relevant documents are selected by identifying a place in a relevance-ranked list of documents where a significant change in relevance score occurs between consecutive results. So, if, for example, there are documents with relevance numbers of 90, 89, 87, 85, 82, 80, 60, 59, 58 . . . then a threshold relevance number of 80 may be selected because it occurs prior to the relatively larger twenty-point relevance drop to the next document.

After the most relevant documents have been selected, the disambiguation engine may determine the most distinctive related key words 616 in those documents. The most relevant keywords may be determined by weighting the highest TF.IDF terms in the documents by the relevance number of the document in which they appear, and taking a sum of that product over all the documents for each term. The terms having results over a threshold, or a fixed number of highest resulting terms, may be selected by the disambiguation engine as most distinctive related keywords 616. These selected keywords may be presented to the entity to determine if the keyword is useful 620. For example, the keywords may be listed in the disambiguation selection area 320 of FIG. 3. The preference entering entity may find that one or more of the identified keywords helps to refine the preference they have entered, or for other reasons should be included in their electronic profile, and may indicate the keyword should be added 622 to their preference. The disambiguation engine may further continue the disambiguation operation by repeating the process shown in FIG. 6 using the added preference terms. If keywords are not identified as belonging to an entity's preference, the declared preference is stored 624.

Examples of systems and methods for identifying relevant terms and indexing that may be used to implement disambiguation and indexing engines in accordance with embodiments of the present invention are described in co-pending U.S. Provisional Application 61/122,282 entitled, "Determining relevant information for domains of interest," filed Dec. 12, 2008, which application is hereby incorporated by reference in its entirety for any purpose.

Accordingly, examples of the entry of profile information and refinement of entered profile information have been described above that may facilitate the creation and storage of electronic profiles. Referring back to FIG. 1, the information contained in an entity's electronic profile may be used by the analysis engine 125 to take a predictive or deterministic action. A variety of predictive or deterministic actions may be taken by the analysis engine 125 based in part on information contained in an entity's electronic profile. Products, things, locations, or services may be selected and suggested, described, or presented to an entity based on information contained in the entity's electronic profile. In other embodiments, other entities may be notified of a possible connection to or interest in an entity based on their electronic profile. Content on a website browsed by an entity may be modified in accordance with their profile in some embodiments. The content modification may include the ordering or ranking of content in the display, highlighting of content, shaping of content, or combinations thereof. The profiling system 110 may also generate or assist in the provider device generating a notification, alert, email, message, or other correspondence for the entity based on its profile. Accordingly, the analysis engine may take action for the entity or for third parties based on the entity's profile information. In one embodiment, which will be described further below, the analysis engine 125 selects content for presentation to the entity based on their electronic profile.

Figure 7:
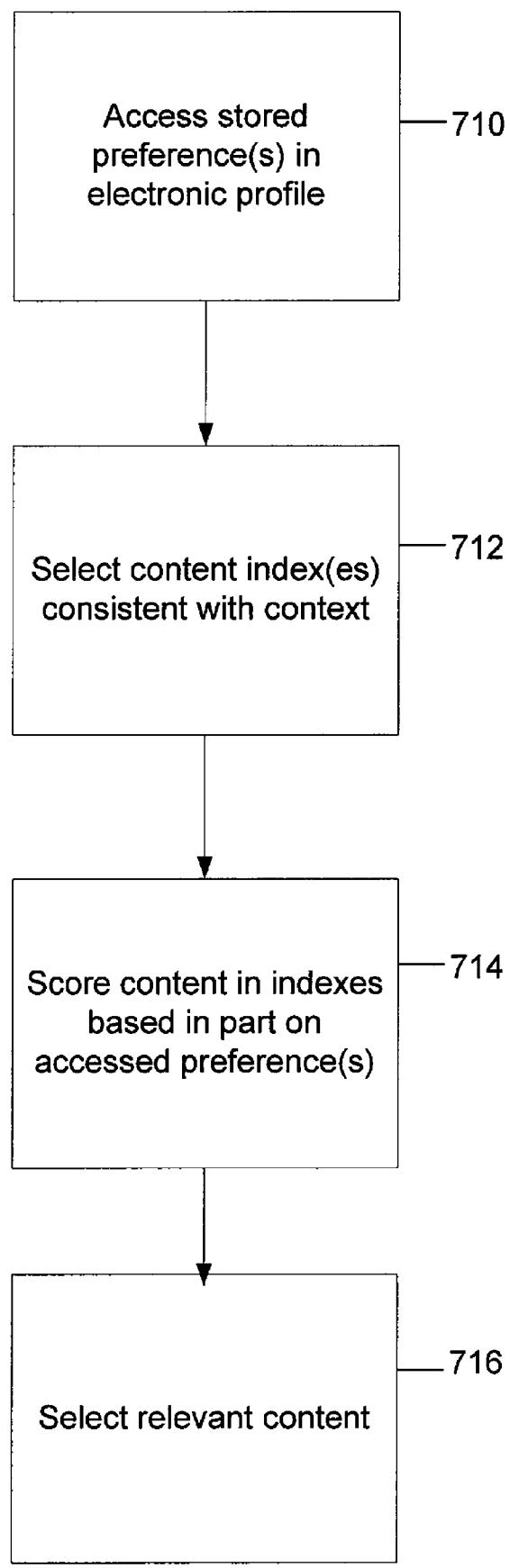
FIG. 7 is a flowchart illustrating operation of an analysis engine according to an embodiment of the present invention.

An example of operation of the analysis engine 125 to select relevant content for an entity is shown in FIG. 7. The analysis engine 125 accesses 710 one or more aspects, such as a preference, in an entity's electronic profile. In some embodiments, a single stored preference is accessed, in some embodiments selected preferences may be accessed, and in some embodiments all stored preferences may be accessed. In some embodiments, other aspects of the profile may be accessed instead of or in addition to one or more preferences. The analysis engine 125 may access an entity's electronic profile responsive to a request from the entity or a third party, such as the provider device 145 in FIG. 1, to provide relevant information for the entity. The selection of which preferences associated with an entity to access may in some embodiments be made according to the context of the request for analysis. For example, if the request comes from a sports content provider, one or more sports-related preferences may be accessed. In other embodiments, multiple preferences may be accessed and the context of the request or of the entity may alter the manner in which the relevance number is computed. For example, in some embodiments a total relevance number is calculated by summing individual relevance numbers calculated using a respective preference. A weighted sum may also be taken, with the weight accorded to each individual relevance number based on the preference with which it is associated. Accordingly, an entity's context, which may be stored in the entity's electronic profile, may determine the weighting of individual preferences in calculating a relevance number.

In addition to selecting relevant content for a user based on their electronic profile, in some embodiments the analysis engine 125 may alternatively or in addition select entities having profiles, or portions of profiles, most relevant to a particular set of content. For example, referring back to FIG. 1, the provider device 145 may communicate an indication of selected content, or all content, from the content storage 155. The analysis engine 125 may then score one or more electronic profiles 140 (or aspects of those profiles) based on the content, as generally outlined above. The analysis engine 125 may then report to the provider device 145 a selection of entity profiles that may be relevant to the content provided by the provider device, or report back an aspect of profiles that are relevant. For example, the analysis engine may indicate particular entities that are relevant to the content, or an aspect of those entities—such as reporting that entities who like horses or sports appear to be relevant to the content provided by the provider device 145. This may aid the provider in targeting their content more effectively or preparing mailings or other communications to users. As above, in some embodiments, electronic profiles are only utilized when the profile specifies it may be used to conduct analysis for the provider.

In other embodiments, a specific request may not be required to begin the process shown in FIG. 7. The analysis engine 125 may select 712 one or more content indices for analysis based on a context in which the analysis 125 is operating. In some embodiments, the content index or indices to use may already be known, or there may only be one, in which case the selection 712 may not be necessary. In other embodiments, the context surrounding the request for analysis may allow the analysis engine 125 to select one or more content indices for analysis. For example, if the provider device 145 of FIG. 1 is a sports online service provider, the analysis engine 125 may select a sports related content index. Or if the provider, such as the provider device 145, requests analysis of a specific content store, such as the content in storage 155 of FIG. 1, the analysis engine may select an index associated with the content in storage 155.

Referring back to FIG. 7, the analysis engine scores 714 content in the selected indices based on the accessed preferences. The scoring process may occur in any manner, including a manner that allows the analysis engine to evaluate content items based on terms in the stored preference. In one embodiment, the scoring process includes assigning a relevance number to content items based on the preference as described above with reference to FIG. 6 and the document rating 614 performed during preference disambiguation. However, in this case, the content items are simply scored and further analysis of relevant terms within the document may not be done, as was done during preference disambiguation. Examples and techniques for content scoring usable with embodiments of the present application are described in co-pending U.S. Provisional Application 61/122,282 entitled "Determining relevant information for domains of interest," filed Dec. 12, 2008, which application is incorporated herein by reference in its entirety for any purpose.

Accordingly, content items in the selected indices may be scored by calculating a relevance number using the term(s) in the accessed electronic profile preference. Relevant content may then be selected 716 in a similar manner to the selection of documents and terms for the disambiguation of preferences described above. That is, content may be selected having a relevance number over a threshold, or a fixed number of highest rated content items may be selected, or all content items preceding a sharp decline in relevance number may be selected. The selected content items, their ratings, or both may then be transmitted to the provider device 145 of FIG. 1 or, in some embodiments, directly to the user device 130. The selected content items may be displayed in the content area 330 of the user device display shown in FIG. 3. The provider device, user device, or both, may handle received content in accordance with its relevance number and may, for example, display the content differently or at a different time based on its relevance. In some embodiments, accordingly, the relevance number need not be used to select content, but may be used to change the way one or more content items are handled by the user device or provider device.

Figure 8:
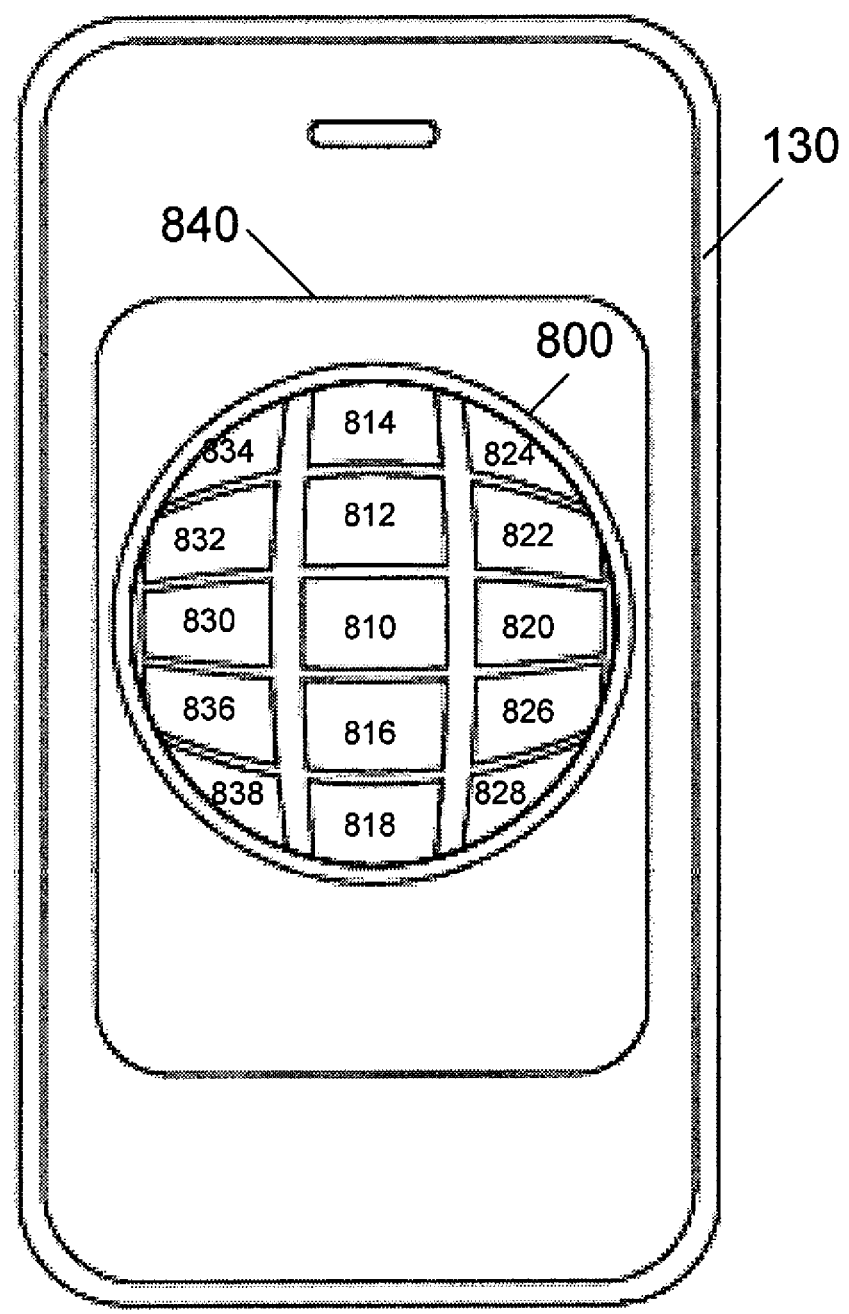
FIG. 8 is a schematic illustration of a user interface according to an embodiment of the present invention.

Selected content items may be displayed using other interfaces, and may be arranged according to their relevance number. For example, content items identified by the analysis engine may be displayed to the entity in order of increasing or decreasing relevance. An embodiment of a user interface 800 to display relevant content to a user is shown in FIG. 8. The user interface 800 is displayed on a touch screen display 840 of the user device 130, shown in FIG. 8 implemented as a handheld device. The user interface 800 displays a plurality of content items 810-838. Each item may include a picture, text, a link to further content represented by the picture or text, or combinations thereof. The content items are positioned within the user interface 800 according to their relevance to the entity's profile. The user interface contains content items positioned to appear as though they were laid on a surface of a sphere, although the display 840 may be flat. In one embodiment, the content items are arranged such that they are placed a distance from a center of the user interface 800 that corresponds to their relevance number. That is, content items may have decreasing relevance according to their angular distance from a center of the user interface 800.

Accordingly, the center content item 810 may be a content item having a highest identified relevance number, while content items 820, 816, 830, and 812 have next highest relevance numbers, content items 836, 826, 822, and 832 have the next highest relevance numbers, and content items 834, 824, 828, and 838 have the next highest. The user interface 800 may be interactive, such that a user may select a line of content items either in longitude or latitude by, for example, touching the line. Once selected, the user may scroll across latitude or longitude. Further relevant content (not shown in FIG. 8) may accordingly be rotated into view.

The user interface 800 may also be used to disambiguate preference information, as generally described above. A user entered preference term may appear as the item 810. Related keywords identified by the disambiguation engine 120 according to an embodiment of the process shown in FIG. 6 may be displayed in the locations shown by items 812-838, again generally placed at an angular distance determined by their relevance to the item 810. In some embodiments, successive bands of displayed content or disambiguation terms refine the relevance in different ways. For example, in one embodiment, the item 810 corresponds to an entity expressed preference term. Related keywords identified according to the term 810 may be placed in the latitude band of 810, such as 820, 830, and others which may not be shown. The next latitude band including items 832, 812, and 822, may be generated by identifying relevant keywords using two terms. For example, a relevant keyword may be displayed as item 832 using both the term at item 810 and at item 830 to query a content store.

Similarly or in addition, different latitude or longitude bands may correspond to different categories of information. For example, if an entity expressed preference term is 'baseball', baseball may be shown at item 810. Different names of baseball players may accordingly be displayed at items 812, 814, 816, and 818 while different names of baseball teams may be displayed at items 822, 824, 826, and 828. As described above, the term shown at item 822 may be determined by relevance to multiple terms including the term at positions 810 and 812. Accordingly, if the player "Alex Rodriguez" appears at item 812, the team that player plays for (the Yankees) may appear at item 822. As described above, a user may then select any latitude or longitude band and rotate it to bring additional options into the display area. If the entity viewing the user interface 800 determines any of the displayed preference disambiguation terms to be relevant to their preference, they may so indicate, by for example, touching or tapping the relevant item, and it may be added to the entity's preference as described above with reference to FIG. 6. In other embodiments, the user interface 800 may include items displayed as though arranged on a plurality of nested spheres. The different spheres may contain different categories of relevant keywords. So, for example, the names of baseball players may be displayed at all item positions shown in FIG. 8 while another sphere—larger or smaller in radius than the illustrated sphere—displays the names of baseball teams.

Another embodiment of a user profile management interface is shown in FIGS. 9 and 10. Again, the embodiment is shown implemented on the user device 130, shown as a hand held device having the touch screen display 840. In a first view, the user device 130 displays a preference entry field 910 and may also display terms associated with two stored preferences 920 and 930. The stored preference 920 includes terms Babe, ruth, grand jury, barry, magowan, bonds, and record. The stored preference 930 includes terms Seattle Mariners, Seattle, and Mariners. An entity may enter terms for a new preference by entering terms into the preference entry field 910. As an example, an entity may enter the term 'Dodgers' into the preference entry field 910. A clarification view may then be displayed by the user device 130, as shown in FIG. 10. The clarification view includes terms 1010 identified by the disambiguation engine as possibly being relevant to the expressed term. Accordingly, the terms run, score, pitching, hit, Los Angeles, los, and angeles, are displayed by the user device 130 in FIG. 10. An entity may select any of these terms as relating to their profile, and transmit them to the profiling system for inclusion in the entity's profile. For example, the entity may select Los Angeles and pitching. A stored profile may then be created containing the terms Dodgers, Los Angeles, and pitching. In other embodiments, following the selection, additional terms may be displayed by the user device 130 that are determined by the disambiguation engine to be relevant on the basis of all terms entered thusfar.

Examples of scoring content based on user preferences and identifying related relevant keywords have been described above in both an example of disambiguating preference information and scoring content for selection. The calculation of a relevance number based on preference terms was described.

From the foregoing it will be appreciated that, although specific embodiments of the invention have been described herein for purposes of illustration, various modifications may be made without deviating from the spirit and scope of the invention.

What is claimed is:

1. A profiling system comprising:
 a profile management system, including a processor and a memory encoded with computer executable instructions configured to cause the profile management system to receive profile information including at least one preference regarding entities, generate electronic profiles for each respective entity, and store the electronic profiles in an electronic profile storage medium;
 a disambiguation engine configured to receive the at least one preference associated with a respective entity, identify terms related to the preference, and store at least one identified term in the electronic profile storage medium with the respective entity's electronic profile;
 an analysis engine configured to receive a request to evaluate content items for a first entity from a requestor, the analysis engine configured to access the electronic profile of the first entity, compute a relevance number for each of the respective content items based on information retrieved from the electronic profile of the first entity including the at least one preference, wherein the requestor is not permitted to access the profile information;
 an indexing engine configured to index a plurality of content items according to terms contained in plurality of content items and store the indexed content items in a plurality of indexed content stores, wherein each of the plurality of indexed content stores includes indexing information based, at least in part on a relative frequency of terms in the respective list of content items; and
 wherein the disambiguation engine is coupled to one or more of the indexed content stores and configured to identify terms related to the preference by querying the one or more indexed content stores with the preference.

2. The profiling system of claim 1 wherein the electronic profiles include entries in a relational database, each respective electronic profile including a data table containing data associated with the entity and a related user preferences table containing preference IDs for each preference associated with the entity.

3. The profiling system of claim 2 wherein the electronic profile further includes a user preferences terms table related to the user preferences table, the user preferences terms table containing term IDs for each term associated with a preference.

4. The profiling system of claim 3 wherein the electronic profile further includes a preference terms table, the preference terms table related to the user preference terms table, the preference terms table containing at least one term associated with a respective term ID.

5. The profiling system of claim 1 wherein the analysis engine is configured to compute the relevance number for each of the respective content items based in part on calculating term frequency and inverse document frequency numbers for each term in the preference for each content item.

6. The profiling system of claim 1 wherein the relevance number is between 1 and 100.

7. The profiling system of claim 1 wherein the analysis engine receives the request from a requestor and is configured to provide the requestor with at least a portion of the calculated relevance numbers, an indication of content items associated with selected relevance numbers, or combinations thereof.

8. The profiling system of claim 1, wherein the disambiguation engine is configured to select a category-specific content store of the plurality of content stores based, at least in part, on a context of the request or a context of an action of the entity.

9. A user device for use by an entity, the user device comprising:
   a display;
   a processor coupled to the display; and
   a memory, the memory encoded with computer readable instructions that, when executed, cause the processor to:
      receive content items and respective relevance scores associated with each content item, the relevance score computed based in part on a stored electronic profile associated with the entity; and
      render at least a portion of the content items on a display of the user device, the content items rendered to appear as though they were overlaid on a surface of a sphere, an angular distance between each of the content items and a center based in part on the relevance score, wherein the content items are arranged in at least a first band and a second band, and wherein the content items are positioned within the first band based on a relevance score calculated in a first manner, and wherein the content items are positioned within the second band based on a relevance score calculated in a second manner, different than the first manner.

10. The user device according to claim 9 wherein the bands include latitudinal and longitudinal bands.

11. The user device according to claim 10 wherein the content items in one longitudinal band have decreasing relevance numbers based on a distance from the center.

12. The user device according to claim 9 wherein the memory further encodes instructions causing the processor to:
   rotate a visible selection of content items responsive to a user selection.

* * * * *